(12) United States Patent
Andersen et al.

(10) Patent No.: US 12,206,243 B1
(45) Date of Patent: *Jan. 21, 2025

(54) BI-DIRECTIONAL ELECTRICAL MICROGRID OF NETWORKED PROCESSING-ON-DEMAND SYSTEMS

(71) Applicant: Greenlight AI LLC, New York, NY (US)

(72) Inventors: Karl Andersen, New York, NY (US); Vitaly Leokumovich, New York, NY (US)

(73) Assignee: Greenlight AI LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/909,389

(22) Filed: Oct. 8, 2024

Related U.S. Application Data

(63) Continuation-in-part of application No. 18/654,413, filed on May 3, 2024, which is a continuation-in-part of application No. 18/584,265, filed on Feb. 22, 2024, now Pat. No. 12,093,750.

(51) Int. Cl.
| | |
|---|---|
| *G06F 1/32* | (2019.01) |
| *H02J 3/00* | (2006.01) |
| *H02J 3/38* | (2006.01) |
| *G06F 1/3203* | (2019.01) |

(52) U.S. Cl.
CPC .............. *H02J 3/003* (2020.01); *H02J 3/381* (2013.01); *G06F 1/3203* (2013.01)

(58) Field of Classification Search
CPC .... G06F 9/5094; G06F 1/3206; G06F 9/5038; G06F 21/606; G05B 13/048
USPC .......................................................... 713/320
See application file for complete search history.

(56) References Cited

U.S. PATENT DOCUMENTS

| | | | |
|---|---|---|---|
| 8,761,953 B2 * | 6/2014 | Friedrich | G06Q 50/06 700/297 |
| 9,547,353 B1 * | 1/2017 | Marr | G06F 1/3206 |
| 10,169,832 B2 * | 1/2019 | Soysal | H02J 13/00002 |
| 10,430,911 B1 * | 10/2019 | Wilt | G06T 11/60 |
| 11,397,999 B2 * | 7/2022 | McNamara | G06Q 30/0201 |
| 11,695,821 B2 * | 7/2023 | Sabella | G06F 9/5072 709/226 |

(Continued)

*Primary Examiner* — Volvick Derose
(74) *Attorney, Agent, or Firm* — Mark Terry

(57) ABSTRACT

A smart, bi-directional electrical microgrid includes processor-on-demand systems, including a computing device having a processing unit and a memory, an Energy Management System (EMS) configured for regulating power usage and optimizing energy efficiency, a distributed power resource for providing a stable and efficient energy supply, a database configured to store energy metrics, a Large Language Model (LLM) for processing the energy metrics stored to generate an energy management plan, an API gateway providing external systems secure, on-demand access to the processing unit, and a software module for managing the processor-on-demand system according to the energy management plan. The microgrid also includes one or more management servers for managing the delivery and distribution of power among the processor-on-demand systems to optimize efficiency and uptime, and a network of power lines that interconnect the processor-on-demand systems.

18 Claims, 8 Drawing Sheets

(56) References Cited

U.S. PATENT DOCUMENTS

| | | | | |
|---|---|---|---|---|
| 11,983,114 B2* | 5/2024 | Kondiles | | G06F 12/0804 |
| 2005/0182582 A1* | 8/2005 | Chen | | G06F 11/3433 |
| | | | | 702/108 |
| 2010/0179704 A1* | 7/2010 | Ozog | | H02J 7/35 |
| | | | | 703/2 |
| 2011/0060476 A1* | 3/2011 | Iino | | H02J 3/14 |
| | | | | 700/297 |
| 2011/0082596 A1* | 4/2011 | Meagher | | H02J 13/00017 |
| | | | | 700/291 |
| 2011/0082597 A1* | 4/2011 | Meagher | | H02J 3/38 |
| | | | | 700/291 |
| 2011/0169840 A1* | 7/2011 | Bakalash | | G06T 1/00 |
| | | | | 345/505 |
| 2014/0229031 A1* | 8/2014 | Amarin | | H02J 3/00 |
| | | | | 700/295 |
| 2015/0057821 A1* | 2/2015 | Nasle | | G06Q 10/04 |
| | | | | 700/291 |
| 2016/0027143 A1* | 1/2016 | Amidei | | G06F 3/1454 |
| | | | | 345/522 |
| 2016/0370843 A1* | 12/2016 | Gatson | | G06F 1/3206 |
| 2017/0199558 A1* | 7/2017 | Farazmand | | G06F 1/3296 |
| 2017/0331287 A1* | 11/2017 | Kopp | | H02J 3/003 |
| 2018/0232036 A1* | 8/2018 | Varadarajan | | G06F 1/3209 |
| 2018/0276044 A1* | 9/2018 | Fong | | G06F 9/4881 |
| 2018/0330276 A1* | 11/2018 | Dai | | G06F 13/1689 |
| 2019/0137553 A1* | 5/2019 | Mehrhoff | | G06F 17/40 |
| 2020/0091717 A1* | 3/2020 | McNamara | | G05F 1/66 |
| 2020/0167196 A1* | 5/2020 | Smith | | H04L 41/5054 |
| 2020/0334084 A1* | 10/2020 | Jacobson | | G06F 11/3037 |
| 2021/0200255 A1* | 7/2021 | Alla | | G06F 1/324 |
| 2021/0342122 A1* | 11/2021 | Lee, II | | G06F 8/10 |
| 2022/0113790 A1* | 4/2022 | Doshi | | H04L 67/1097 |
| 2022/0308932 A1* | 9/2022 | Kelly | | G06F 9/5027 |
| 2022/0376505 A1* | 11/2022 | Bharti | | H02J 3/144 |
| 2023/0126809 A1* | 4/2023 | He | | G06F 1/3215 |
| | | | | 713/323 |
| 2023/0139439 A1* | 5/2023 | Smeloy | | H04L 9/3297 |
| | | | | 713/320 |
| 2023/0187937 A1* | 6/2023 | McNamara | | G06F 1/20 |
| | | | | 700/295 |
| 2023/0273663 A1* | 8/2023 | Seibel | | G06F 1/329 |
| | | | | 713/320 |
| 2023/0297442 A1* | 9/2023 | Seo | | G06F 9/5011 |
| 2023/0315532 A1* | 10/2023 | Hoffmann | | G06F 9/505 |
| | | | | 718/104 |
| 2024/0012459 A1* | 1/2024 | Guim Bernat | | G06Q 50/50 |
| 2024/0104418 A1* | 3/2024 | Dong | | G06F 9/5027 |

* cited by examiner

BI-DIRECTIONAL ELECTRICAL MICROGRID OF NETWORKED PROCESSING-ON-DEMAND SYSTEMS

CROSS-REFERENCE TO RELATED APPLICATIONS

This patent application is a continuation in part of, and claims priority to, patent application Ser. No. 18/654,413 filed May 3, 2024 and titled "BI-DIRECTIONAL ELECTRICAL MICROGRID OF NETWORKED GPU-ON-DEMAND SYSTEMS," which is a continuation in part of, and claims priority to, patent application Ser. No. 18/584,265 filed Feb. 22, 2024 (Now U.S. Pat. No. 12,093,750) and titled "GPU-ON-DEMAND SYSTEM POWERED BY SELF CONTAINED ENERGY SOURCE." The subject matter of patents application Ser. Nos. 18/654,413 and 18/584,265 (Now U.S. Pat. No. 12,093,750) are hereby incorporated by reference in their entirety.

STATEMENT REGARDING FEDERALLY SPONSORED RESEARCH OR DEVELOPMENT

Not Applicable.

INCORPORATION BY REFERENCE OF MATERIAL SUBMITTED ON A COMPACT DISC

Not Applicable.

TECHNICAL FIELD

The claimed subject matter relates to the field of distributed computing and smart energy resource management. Specifically, the claimed subject matter relates to systems and methods for optimizing energy distribution and usage, as well as providing on-demand access to processing units.

BACKGROUND

In the area of high-performance computing and energy management, the integration of computational resources with power systems presents ongoing challenges and opportunities for innovation. The demand for powerful computing resources, such as Graphics Processing Units (GPUs), has escalated with the rise of advanced applications in fields like artificial intelligence, machine learning, and large-scale data analytics. GPUs can handle complex calculations more efficiently than traditional CPUs and are now essential in both commercial and research environments.

The increased reliance on GPUs has highlighted several inefficiencies in current power management systems. Traditionally, GPUs are housed in large data centers that consume massive amounts of energy, leading to high operational costs and significant environmental impact. The static nature of these data centers often results in inefficiencies related to energy distribution, such as overprovisioning and underutilization of resources, which further exacerbates the cost and environmental issues.

Moreover, the existing infrastructure for energy management within such setups is often rigid and lacks the flexibility to adapt to dynamic changes in demand or to integrate alternative energy sources effectively. As a result, many organizations face challenges in scaling their operations without incurring prohibitive energy costs or impacting their sustainability goals.

Additionally, accessibility to GPUs for computing needs is another critical issue. Many smaller entities and individual researchers face barriers in accessing these resources due to high costs and the complexity of integrating GPUs into their existing infrastructures. The current solutions often involve significant upfront investment in hardware or steep costs associated with cloud-based GPU services, limiting accessibility for a broad range of users.

Furthermore, the geographical centralization of computing resources in specific data centers limits the accessibility for users located far from these centers, leading to increased latencies and reduced performance for remote applications. This centralization also increases the vulnerability of the computing infrastructure to localized power outages or network disruptions, impacting reliability and uptime.

Therefore, there exists a significant need in the prior art for an integrated solution that holistically addresses the challenges of energy efficiency, renewable energy integration, and processing unit access in a manner that is both scalable and user-friendly.

BRIEF SUMMARY

This Summary is provided to introduce a selection of disclosed concepts in a simplified form that are further described below in the Detailed Description including the drawings provided. This Summary is not intended to identify key features or essential features of the claimed subject matter. Nor is this Summary intended to be used to limit the claimed subject matter's scope.

The disclosed embodiments are directed to smart, bi-directional electrical microgrid of processor-on-demand systems available over a communications network, which address the problems with the prior art, namely, the challenges of energy efficiency, renewable energy integration, and processing unit access in a manner that is both scalable and user-friendly.

In one embodiment, a smart, bi-directional electrical microgrid is disclosed. The smart, bi-directional electrical microgrid includes a plurality of processor-on-demand systems, wherein each processor-on-demand system comprises a computing device including a processing unit and a memory, an Energy Management System (EMS) configured for regulating power usage and optimizing energy efficiency, a distributed power resource configured for providing a stable and efficient energy supply, a database configured to store energy metrics gathered from the processor-on-demand system, the energy metrics including at least energy expenditure of the processor-on-demand system, a Large Language Model (LLM) executing on the computing device, the LLM configured for processing the energy metrics stored in the database so as to generate an energy management plan, an API gateway comprising an API coupled to a network connection providing access to a communications network, the API gateway configured for providing external systems secure, on-demand access to the processing unit, and a software module executing on the computing device, the software module configured for managing the processor-on-demand system according to the energy management plan. The microgrid also includes one or more management servers configured for managing the delivery and distribution of power among the plurality of processor-on-demand systems to optimize for efficiency and uptime, and a network of power lines that interconnect the plurality of processor-on-demand systems.

In another embodiment, a method on a server for managing a smart, bi-directional electrical microgrid of a plurality of processor-on-demand systems is disclosed. The method includes collecting energy metrics from each of the plurality of processor-on-demand systems, wherein each processor-on-demand system includes a computing device with a processing unit and a memory, an Energy Management System (EMS) configured for regulating power usage and optimizing energy efficiency, a distributed power resource providing a stable and efficient energy supply, a database for storing energy metrics, including at least energy expenditure, a Large Language Model (LLM) configured for processing the energy metrics so as to generate an energy management plan, an API gateway comprising an API coupled to a network connection providing access to a communications network, the API gateway configured for providing external systems secure, on-demand access to the processing unit, and a software module configured for managing the processor-on-demand system according to the energy management plan. The method further includes reading the collected energy metrics from each of the plurality of processor-on-demand systems, transmitting control signals from a centralized management server to each of the plurality of processor-on-demand systems to adjust power usage dynamically and optimize distribution of energy resources across the microgrid, monitoring and adjusting operational parameters of each of the plurality of processor-on-demand systems in real-time to ensure continuous optimization of energy efficiency and computational performance, and managing interconnection and data exchange between the plurality of processor-on-demand systems via a network of power lines, ensuring bi-directional flow and dynamic routing of power based on system-wide energy management strategies.

Additional aspects of the claimed subject matter will be set forth in part in the description which follows, and in part will be obvious from the description, or may be learned by practice of the claimed subject matter. The aspects of the claimed subject matter will be realized and attained by means of the elements and combinations particularly pointed out in the appended claims. It is to be understood that both the foregoing general description and the following detailed description are exemplary and explanatory only and are not restrictive of the disclosed subject matter, as claimed.

BRIEF DESCRIPTION OF THE SEVERAL VIEWS OF THE DRAWINGS

The accompanying drawings, which are incorporated in and constitute part of this specification, illustrate embodiments of the claimed subject matter and together with the description, serve to explain the principles of the claimed subject matter. The embodiments illustrated herein are presently preferred, it being understood, however, that the claimed subject matter is not limited to the precise arrangements and instrumentalities shown, wherein:

DETAILED DESCRIPTION

Figure 1A:
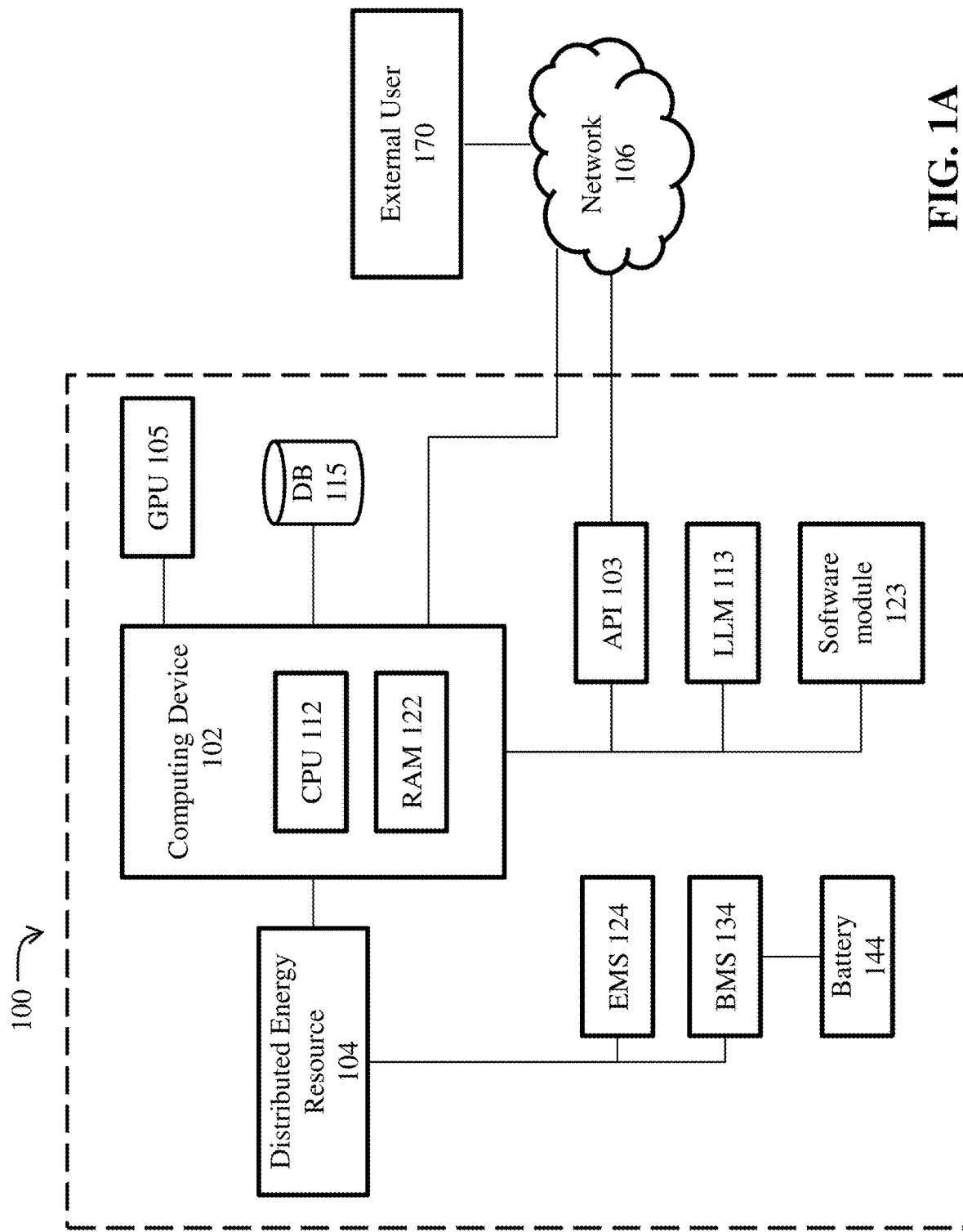
FIG. 1A is a block diagram illustrating the network architecture of a processor-on-demand system that is a member of a smart, bi-directional electrical microgrid, in accordance with one embodiment.

The following detailed description refers to the accompanying drawings. Whenever possible, the same reference numbers are used in the drawings and the following description to refer to the same or similar elements. While disclosed embodiments may be described, modifications, adaptations, and other implementations are possible. For example, substitutions, additions or modifications may be made to the elements illustrated in the drawings, and the methods described herein may be modified by substituting, reordering, or adding additional stages or components to the disclosed methods and devices. Accordingly, the following detailed description does not limit the disclosed embodiments. Instead, the proper scope of the disclosed embodiments is defined by the appended claims.

The claimed embodiments, which include networking a plurality of self-contained, energy-producing processor-on-demand systems into a microgrid, offer several significant benefits, particularly in contexts that demand high computational power alongside efficient energy management. By linking multiple processor-on-demand systems into a microgrid, the energy generated by each unit can be dynamically allocated where it's needed most, optimizing energy use and reducing waste. This networked structure enhances the reliability of power and computing resources by providing redundancy, maintaining uninterrupted service even if one unit fails or undergoes maintenance, which is crucial in critical applications requiring high availability. Additionally, a microgrid allows for scalability in both energy production and computational power. As demand grows, more processor-on-demand units can be seamlessly integrated, enhancing capacity without significant redesign. This setup proves cost-effective as shared infrastructure and energy resources reduce capital and operational expenses, and the microgrid can be managed to optimize energy consumption, further reducing costs associated with energy peaks.

Integrating renewable energy sources into the processor-on-demand systems also aligns with global trends pushing for greener technologies, helping reduce the carbon footprint and enhance sustainability. The network can dynamically adjust which units handle computational loads based on factors like energy availability and system demand, improving load management and ensuring no unit is overloaded. A networked approach facilitates centralized data management, improving data consistency and security by enabling unified security protocols across the microgrid. Advanced AI and machine learning algorithms, such as those in Large Language Models (LLMs), enable the system to autonomously manage energy and computational resources, predicting demand and adjusting supplies proactively.

Moreover, in regions with strict regulations on energy use and carbon emissions, microgrids can provide a compliant solution by optimizing energy usage and integrating renewable resources, meeting regulatory standards more effectively. For research institutions and companies focusing on high-performance computing applications, such as AI training and big data analytics, access to a robust processor-on-demand microgrid can significantly speed up experiments and development cycles, providing a competitive edge. These benefits collectively contribute to a more robust, efficient, and sustainable approach to managing both computational and energy resources, crucial in today's increasingly digital and environmentally conscious world.

Further, the disclosed embodiments address the inefficiencies and limitations of existing energy management and processing unit access systems by introducing a comprehensive processor-on-demand system. The API gateway facilitates secure, on-demand access to the processing unit, broadening the system's applicability across various external systems and user needs. Moreover, the software module's management of the processor-on-demand system according to the energy management plan promotes optimal system performance and user control. The disclosed embodiments significantly mitigate the challenges associated with high energy consumption and limited access to high-performance computing resources in traditional systems. This is particularly advantageous for entities requiring scalable and efficient computing resources, as it ensures greater accessibility to processing unit capabilities without compromising on energy efficiency or operational costs. An additional benefit of the disclosed embodiments is the promotion of green computing by integrating renewable energy sources and optimizing energy usage, which not only reduces the carbon footprint of computing operations but also aligns with global sustainability goals. The primary benefit of the claimed subject matter is the facilitation of advanced computing tasks with minimal environmental impact and enhanced energy efficiency, thereby advancing the field of high-performance computing and sustainable technology practices.

The claimed processor-on-demand system outlined is considered to have a self-contained energy source because it integrates innovative energy generation and storage mechanisms that allow it to operate independently of external power grids. This self-sufficiency is achieved through the use of renewable energy technologies, possibly including solar panels, wind turbines, or other green technologies, that capture and convert natural energy into usable electrical power. Additionally, the system incorporates advanced battery storage solutions to ensure a continuous power supply, even in the absence of real-time energy generation. This combination enables the system to maintain its operations without relying on external energy sources, embodying the concept of a self-contained energy system.

Referring now to the drawing figures in which like reference designators refer to like elements, there is shown in FIG. 1A a block diagram illustrating the network architecture of a processor-on-demand system 100 that is a member of a smart, bi-directional electrical microgrid, in accordance with one embodiment. A prominent element of FIG. 1A is the computing device 102 associated with repository or database 115 and further communicatively coupled with network 106, which can be a circuit switched network, such as the Public Service Telephone Network (PSTN), or a packet switched network, such as the Internet or the World Wide Web, the global telephone network, a cellular network, a mobile communications network, or any combination of the above. Computing device 102, comprising at least one CPU 112 and a memory (such as RAM) 122, is a central controller or operator for functionality of the claimed processor-on-demand system 100. Computing device 102 may be one or more workstations, servers, web servers, desktop computers, laptops, all-in-one computers, virtual machines, mobile computing device, smart phones, tablet computers, handheld computers, or the like. Computing device 102 may be communicatively coupled with network 106 in a wired or wireless fashion.

FIG. 1A further shows that the system 100 includes one or more GPUs 105. A GPU is a specialized electronic circuit designed to accelerate the manipulation and creation of images and graphics, but due to its ability to process multiple data streams simultaneously, is also used for a broader range of computational tasks, including scientific research, machine learning, and data analytics for high-performance computing environments. The claimed invention offers the computing power of the one or more GPUs 105 on-demand via a communications network 106, to meet the intensive computational demands of contemporary applications. Ownership of high-end GPUs can be an impractical investment for many users, including small businesses, researchers, and developers. By providing on-demand access to GPU resources, the claimed invention ensures that users can access the computational power they require without the need for significant capital investment in expensive hardware, offering a solution that is both cost-effective and efficient. Moreover, the on-demand model promotes cost efficiency by aligning expenses directly with usage, eliminating the financial burdens of upfront hardware investment and ongoing maintenance. Additionally, the centralized management of GPU resources under this system enhances energy efficiency, optimizing power usage across tasks and contributing to a reduction in overall energy consumption, which is both economically and environmentally beneficial.

FIG. 1A further shows that the system 100 includes a distributed energy resource (DES) 104. A distributed energy resource encompasses a variety of small-scale electricity supply or demand resources that are either connected to the local distribution grid or located on the customer side of the meter. Distributed energy resources include technologies capable of generating or storing electricity, as well as those that can manage energy demand and enhance grid resilience and efficiency. Among these technologies are solar photovoltaic panels, which convert sunlight into electricity and can be installed on rooftops or in ground-mounted solar farms. Wind turbines, particularly small or micro versions, generate electricity for individual homes, farms, or small businesses. Battery energy storage systems store electrical energy for later use, enabling better energy management and providing backup power. Electric vehicles and their charging infrastructure not only consume electricity but can also act as mobile storage units that may feed electricity back into the grid. Combined heat and power systems generate electricity and useful thermal energy in a single, integrated system, improving overall energy efficiency. By operating individually or in an aggregated manner, distributed energy resources provide peak load reduction, grid balancing, and the integration of renewable energy sources. Distributed energy resources reduce reliance on centralized power plants and long-distance electricity transmission. This not only potentially lowers energy costs and reduces transmission losses but also contributes to the reduction of greenhouse gas emissions. In one embodiment, the DES 104 may comprise one or more distributed energy resources.

FIG. 1A also shows an external user 170, which represents a user or consumer of the processor-on-demand services offered by system 100 over the communications network 106. The external user 170 may be a person, a company, an organization, or a network of individuals or companies. The external user 170 may represent the information technology infrastructure, including servers and computers, which are used by the external user 170 to consume the processor-on-demand services of system 100 over the communications network 106.

Returning to computing device 102, FIG. 1 further shows that computing device 102 includes one or more databases or repositories 115, which may be a local database, or a cloud database located in the cloud and accessible via network 106. Devices 105, 124, 134 may also each include their own database. The one or more databases or repositories 115 serves data to the devices of system 100 during the course of operation of the disclosed embodiments. The one or more databases or repositories 115 may be distributed over one or more nodes or locations that are connected via network 106.

The one or more databases or repositories 115 may be used to store energy metrics pertaining to system 100. The processor-on-demand system 100 gathers a comprehensive set of energy metrics that are critical for optimizing energy usage and enhancing operational efficiency by the LLM 113 described in more detail below. The stored metrics include the total energy used by the computing device, with a specific focus on the GPU's power usage over time, measured in kilowatt-hours (kWh) or joules. This provides a foundational understanding of the system's energy demands. The system 100 further stores computational output data, the amount of energy supplied by renewable resources, the cost of energy consumed, carbon emissions, etc.

The organization of collected energy metrics within the one or more databases or repositories 115 is structured to facilitate efficient data retrieval, analysis, and reporting. Each data point is timestamped, enabling the analysis of energy metrics over time and the identification of trends by the LLM. Metrics are categorized into distinct sets such as consumption, efficiency, and cost, to streamline queries and analyses. This categorization supports the implementation of the energy management plan by enabling targeted assessments of specific areas of interest. Data is organized hierarchically, and key metrics are indexed to expedite search operations, especially for real-time monitoring and decision-making processes. Sensitive information, including operational parameters and energy consumption patterns, is encrypted to ensure data privacy and security, safeguarding against unauthorized access and maintaining the integrity of the energy metrics.

The one or more databases or repositories 115 may further include a user record for each external user or consumer 170. A user record may include: contact/identifying information for the user (name, address, telephone number(s), email address, etc.), information pertaining to credits associated with the user, electronic payment information for the user, information pertaining to the purchases made by the user, sales transaction data associated with the user, etc. A user record may also include a unique identifier for each user, a residential address for each user, the current location of each user (based on location-based services from the user's mobile computer) and a description of past services purchased by each user. A user record may further include demographic data for each user, such as age, sex, income data, race, color, marital status, etc. A user record may also include a user credit, which is a credit that is used by a consumer while using system 100. Said credit can be used to purchase services. Credit refers to any medium of exchange, which can include digital currency, purchase cards, gift cards, user credits, points, etc.

Sales transaction data may include one or more service identifiers (such as SKUs), one or more service amounts, buyer contact/identifying information, and electronic payment information. In one embodiment, electronic payment information may comprise buyer contact/identifying information and any data garnered from a purchase card (i.e., purchase card data), as well as any authentication information that accompanies the purchase card. Purchase card data may comprise any data garnered from a purchase card and any authentication information that accompanies the purchase card. In one embodiment, electronic payment information may comprise user login data, such as a login name and password, or authentication information, which is used to access an account that is used to make a payment.

FIG. 1A also shows a Large Language Model (LLM) 113, which is an advanced artificial intelligence system designed to understand, generate, and interact with human language at a level that approaches natural understanding. LLMs are trained on vast datasets of text, enabling them to predict the likelihood of a sequence of words and thus generate coherent and contextually relevant text outputs. LLM 113 processes and analyzes large volumes of textual data, making it particularly suited for optimizing energy management strategies. By analyzing energy metrics, usage patterns, and operational data, the LLM 113 can generate insights and recommendations to improve energy efficiency, predict future energy needs, and automate the management of distributed energy resources. the LLM's capability to learn from data patterns enables the system to continuously refine its energy management plan, ensuring that the processor-on-demand system operates at peak efficiency while adapting to changing energy conditions and requirements.

The LLM 113 calculates the power efficiency by reading the data stored in the database 115 determining the ratio of computational output to the energy consumed, offering insights into the efficiency of the GPU under various loads. The LLM 113 identifies peak power demand within specified periods, allowing for strategic planning of energy resource allocation to mitigate peak charges and optimize usage. The LLM 113 tracks the amount and percentage of energy supplied by renewable resources, underscoring the system's success in integrating green energy sources. Additionally, LLM 113 analyzes the cost of energy consumed, taking into account dynamic pricing and peak usage tariffs, which aids in financial optimization. The carbon emissions associated with energy consumption are estimated by the LLM 113, providing vital data for environmental impact assessments and sustainability reporting. This structured approach enables the LLM 113 to perform comprehensive energy analysis, generate accurate, actionable insights for energy management, optimize operational efficiency, and support environmental sustainability initiatives, all within a secure and efficiently organized database environment.

One of the functions of the LLM 113 is to create an energy management plan. The energy management represents a strategy designed to optimize the use of energy resources within the processor-on-demand system 100. By analyzing historical energy consumption data, current energy metrics, and predictive energy demand (all stored in the database 115), the LLM formulates the energy management plan. This plan delineates the most efficient ways to allocate energy resources, incorporating the use of renewable energy sources, managing the charging and discharging cycles of batteries, and dynamically adjusting power usage based on real-time demand and supply conditions.

The goal of the energy management plan is to ensure that the system operates at maximum efficiency, minimizing energy waste and reducing operational costs while maintaining high performance and reliability of the GPU resources. The energy management plan enables a sustainable, cost-effective, and efficient operational model for on-demand processing unit services. By dynamically optimizing energy usage, the plan supports the scaling of computational resources to meet user demand without incurring unnecessary energy expenditure or compromising environmental sustainability. It ensures that energy consumption aligns with the availability of renewable resources, thereby reducing the carbon footprint of the computing operations. Moreover, the plan's adaptability, powered by the LLM's continuous learning and data analysis capabilities, allows the system to respond to changing energy prices, usage patterns, and technological advancements. In essence, the energy management plan balances the objectives of environmental sustainability and computational efficiency. The energy management plan may further be used to dynamically adjust computing tasks of the computing device 102 based on current energy availability and predicted workload, to maximize GPU utilization while adhering to energy efficiency goals. Note that in order to calculate predicted workload historical workload data (which was previously stored) must be reviewed in order to come up with a prediction about what workload is predicted to be encountered in the future.

The LLM 113 may further identify potential problem issues within the system and provides users with actionable troubleshooting advice. This capability allows for quick resolution of operational challenges, ensuring the system maintains optimal performance and reliability. Among other things, the LLM is configured for processing the energy metrics stored in the one or more databases so as to generate an energy management plan that is configured to: 1) manage when each of the plurality of distributed energy resources 104 shall be used by the processor-on-demand system, 2) dynamically adjust computing tasks of the computing device 102 based on current energy availability and predicted workload, and 3) maximize GPU 105 utilization while adhering to energy efficiency goals.

The distributed energy resource (DES) 104 includes an energy management system (EMS) 124, a battery 144 and a Battery Management System (BMS) 134. The EMS 124 is a control system engineered to regulate and optimize the energy flow within DES 104. The EMS 124 constantly analyzes energy consumption patterns, predicting future energy needs, and making real-time decisions to balance energy supply with demand. The EMS 124 ensures that the DES 104 operates at peak efficiency, minimizes energy waste, and adapts to changing conditions without human intervention. It interfaces with both the BMS 134 and the battery 144 to coordinate the optimal use of stored energy and the integration of renewable energy sources when available. The battery 144 acts as the energy storage component, providing a reservoir of electrical power that can be drawn upon as needed. It is critical for ensuring that the DES 104 can maintain energy supply during periods of high demand or when renewable energy sources are insufficient. The battery 144's capacity to store energy enables the system to leverage energy generated during off-peak times, thus enhancing energy efficiency and reducing operational costs.

The EMS 124 may employ predictive analytics to accurately forecast the future energy demand of the computing device 102, enabling it to proactively adjust the power usage of the device. By analyzing historical energy consumption patterns and correlating them with computational load forecasts, the EMS can anticipate periods of high demand and optimize energy distribution accordingly, ensuring efficient use of resources while maintaining optimal performance. The EMS 124 may further be configured to automatically switch between the primary power source and a secondary power source based on predefined criteria, such as the cost of electricity and the carbon footprint associated with each source. This intelligent switching ensures that the system consistently meets its defined energy efficiency goals by optimizing for both economic and environmental factors.

The BMS 134 is a subsystem designed to monitor and manage the operational parameters of the battery 144. It ensures the safety, reliability, and longevity of the battery by constantly monitoring its state-of-charge (SoC), state-of-health (SoH), temperature, and voltage. The BMS 134 prevents overcharging or deep discharging of the battery, both of which can significantly impact its performance and lifespan. By integrating with the EMS 124, the BMS 134 contributes to the management of energy storage and discharge, ensuring that the battery 144 is utilized efficiently and sustainably.

Together, the components of the DES 104 form an energy management subsystem within the system 100. The EMS 124, with its capability to analyze and predict energy patterns, takes actions that optimize energy usage of the system. It directs the BMS 134 to manage the battery 144's charge and discharge processes, ensuring that energy is available when needed and stored when excess is generated. The battery 144, under the direction of the BMS 134, supplies energy to the system, acting as a buffer against fluctuations in energy demand and generation.

In one embodiment, the distributed energy resources are enhanced by the inclusion of renewable energy sources, which are seamlessly integrated with the BMS 134 to prioritize the consumption of renewable energy. This integration ensures that the system maximizes the use of sustainable energy sources, such as solar or wind power, thereby reducing reliance on non-renewable energy and promoting environmental sustainability.

FIG. 1A shows an embodiment wherein networked computing device 102 interacts with external user 170 over the network 106. It should be noted that although FIG. 1 shows only one computing device 102 and one external user 170, the system of the disclosed embodiments supports any number of networked computing devices and external users connected via network 106. Further, computing device 102 and external user 170 include program logic such as computer programs, mobile applications, executable files or computer instructions (including computer source code, scripting language code or interpreted language code that may be compiled to produce an executable file or that may be interpreted at run-time) that perform various functions of the disclosed embodiments.

Note that although computing device 102 is shown as a single and independent entity, in one embodiment, the functions of computing device 102 may be integrated with another entity. Further, computing device 102 and its functionality, according to a preferred embodiment, can be realized in a centralized fashion in one computer system or in a distributed fashion wherein different elements are spread across several interconnected computer systems.

FIG. 1A further includes an API gateway 103 comprising an application programming interface (API) coupled to a network connection providing access to the communications network 106, the API gateway configured for providing external systems (such as external user 170) secure, on-demand access to the GPU 105. The API gateway 103 executes on the computing device 102 and serves as an intermediary between external user 170 and services of GPU 105, acting as both a gatekeeper and a facilitator for API calls. The API gateway 103 manages requests from external user 170 (such as web or mobile applications) by routing them to the appropriate backend services at GPU 105, while also implementing various cross-cutting concerns like authentication, rate limiting, and logging. Rate limiting an API means imposing restrictions on the number of requests a client can make to the API within a specified time period. Rate limiting is typically enforced by setting a maximum number of allowed requests per unit of time, such as per second, minute, or hour.

The API gateway 103 provides secure, on-demand access to the resources of GPU 105 over the communications network 106. By handling authentication and authorization, the API gateway ensures that only legitimate requests are processed, safeguarding the system against unauthorized access and potential security threats. Furthermore, the API gateway can efficiently manage the load on the GPU 105 by distributing requests among available GPUs, optimizing resource utilization, and preventing any single resource from becoming a bottleneck. The API gateway's capability to monitor and log access requests also contributes to the overall management and optimization of the system, allowing for the analysis of usage patterns and the adjustment of resources accordingly. The API gateway 103 also enhances the scalability and efficiency of the processor-on-demand system 100. The API gateway may support multiple protocols for integration with various external systems, including REST, GraphQL, and WebSocket, so as to facilitate on-demand GPU services.

FIG. 1A further includes a software module 123 executing on the computing device 102, the software module configured for managing the processor-on-demand system 100 according to the energy management plan. The software module 123 orchestrates the various components of the processor-on-demand system 100 to ensure seamless, efficient, and secure provision of GPU resources. It manages the system's functionalities, including the execution of the energy management plan, coordination with the API gateway for handling requests, and interfacing with the distributed energy resources and the EMS. By leveraging the data stored in the database 115, the software module 123 dynamically adjusts the allocation of GPU resources based on current demand, energy availability, and the operational guidelines set forth by the energy management plan. This ensures that computational tasks are executed efficiently, optimizing the use of both computational and energy resources.

The software module 123 enables a high degree of automation and intelligence in how resources are managed and utilized. The software module 123 minimizes energy consumption and operational costs while maximizing the performance and availability of GPU resources for users. Through its integration with the EMS and the API gateway, the software module 123 ensures that energy efficiency goals are met without compromising service quality, thereby facilitating sustainable and scalable high-performance computing services. Its ability to adapt to changing conditions-whether in user demand, energy prices, or resource availability-ensures that the processor-on-demand system 100 remains efficient and responsive to the needs of its external users.

The software module 123 may be equipped with a user interface (UI) that offers users real-time monitoring and control capabilities over the energy management plan. This feature enables users to manually adjust operational parameters and set specific energy efficiency goals, thus allowing for personalized management of energy usage and optimization according to individual or organizational needs. The software module 123 may also generate automated reports on energy savings and system performance, enabling users to effectively track improvements over time and pinpoint areas ripe for further optimization. This functionality facilitates a deeper understanding of energy consumption patterns and the impact of implemented efficiency measures, guiding users in making informed decisions to enhance system efficiency and sustainability.

Among other things, the software module 123 is configured for managing the processor-on-demand system according to the energy management plan generated by the LLM 113 by: 1) controlling usage of the plurality of distributed energy resources 104, 2) rate limiting the API gateway 103 and 3) dynamically adjusting the computing tasks of the computing device 102.

Figure 1B:
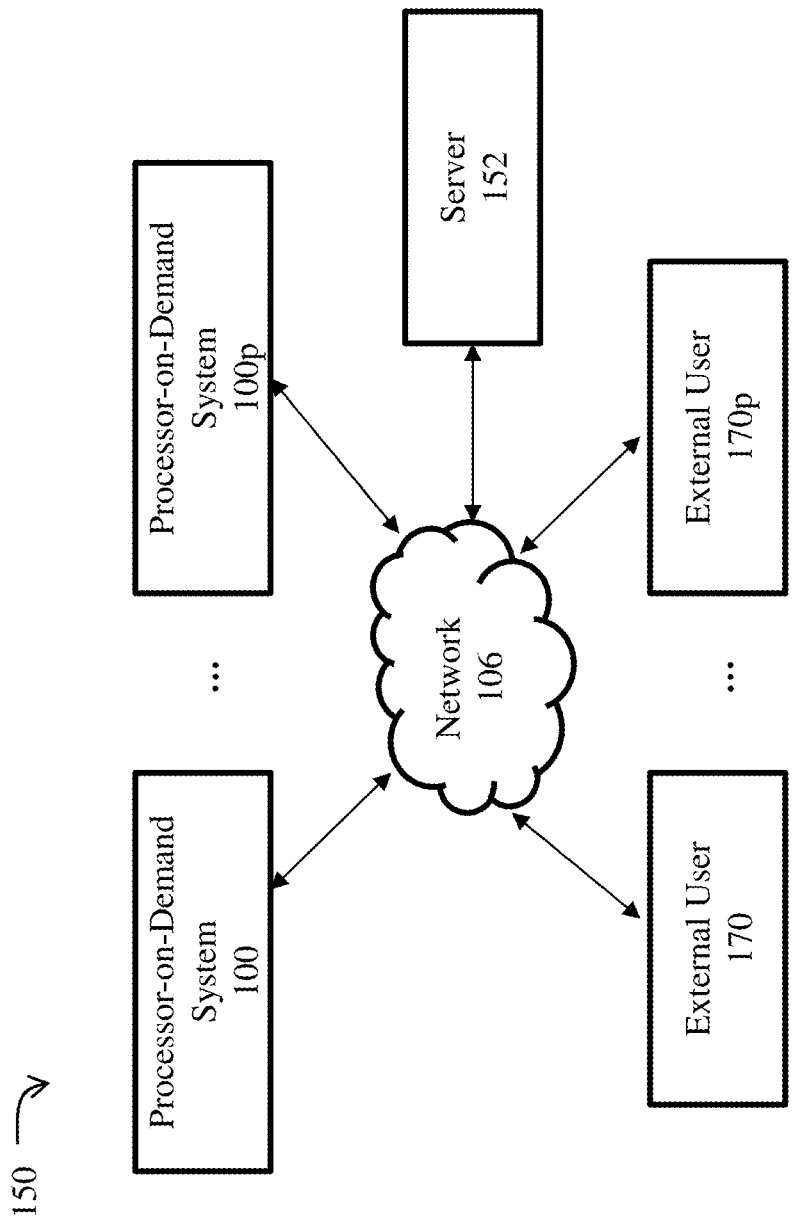
FIG. 1B is a block diagram illustrating the network architecture of a smart, bi-directional electrical microgrid comprising a plurality of processor-on-demand systems available over a communications network, in accordance with one embodiment.

FIG. 1B is a block diagram illustrating the network architecture of a smart, bi-directional electrical microgrid comprising a plurality of processor-on-demand systems 100-100*p* available over the communications network 106, in accordance with one embodiment. FIG. 1B shows an embodiment wherein a plurality of processor-on-demand systems 100-100*p* work together to offer processor-on-demand resources to a multitude of external users 170-170*p*, indicating not just a singular user but potentially hundreds or thousands of users, each with unique computational demands.

In this embodiment, each processor-on-demand system within the range of 100 to 100*p* is interconnected through the communications network 106, which could be the internet or a private network, allowing them to share resources and balance loads effectively. This networked approach enables the distributed system 150 to leverage the combined power and capacity of all the individual processor-on-demand systems, enhancing its ability to handle large-scale computational tasks and serve a significantly larger user base. Users, identified from 170 to 170*p*, can access the distributed system 150 through various entry points, ensuring redundancy and high availability of resources. This architecture not only maximizes the utilization of each GPU within the system but also provides a scalable and resilient framework for delivering high-performance computing resources to users across different geographic locations.

The integration of multiple processor-on-demand systems into a unified network architecture allows for advanced resource management strategies, such as load balancing and dynamic resource allocation, to ensure optimal performance and energy efficiency. By distributing computational tasks across multiple systems, the distributed system 150 can better manage peaks in demand without compromising on service quality or performance. Furthermore, this setup enhances the system's fault tolerance, as the failure of a single processor-on-demand system (e.g., system 100) can be mitigated by rerouting requests to other systems within the network (e.g., systems 100*a* to 100*p*), thereby ensuring uninterrupted service to users. FIG. 1B illustrates a robust network architecture that underpins the distributed system 150, showcasing its capability to provide scalable, efficient, and reliable access to processing unit resources on demand. This architecture offers a flexible and dynamic solution that caters to the diverse and evolving computational needs of a broad spectrum of external users.

FIG. 1B further show a management server 152, which is configured to monitor the performance of the plurality of processor-on-demand systems (100-100p) across the communications network 106. This management server ensures the overall health, efficiency, and reliability of the distributed system 150 by continuously assessing the performance of each individual processor-on-demand system within the network. The management server's monitoring capabilities encompass various performance metrics such as system uptime, GPU utilization rates, energy consumption, processing speeds, and potential bottlenecks or failures within any of the processor-on-demand systems.

By aggregating performance data across the network 106, the management server 152 provides a comprehensive overview of the distributed system's operational status, allowing for real-time insights into the health of the GPU resources. This enables system administrators or automated management systems to make informed decisions about load balancing, resource allocation, and energy management, optimizing the performance and efficiency of the distributed system as a whole. For instance, if a particular processor-on-demand system (e.g., system 100) is experiencing high utilization rates and nearing its capacity, the server can facilitate the redistribution of incoming computational requests to less burdened systems (e.g., system 100p), ensuring that no single system becomes a bottleneck and that all users have access to the resources they require.

Moreover, the management server 152's monitoring function provides predictive maintenance and fault detection within the distributed system. By identifying patterns or anomalies that may indicate potential issues or system failures, the server can alert administrators to take preventative actions or deploy corrective measures, thereby minimizing downtime and maintaining high service availability. This approach to system maintenance ensures that the distributed system remains robust and reliable, even as it scales to accommodate increasing numbers of users and more complex computational tasks.

The management server 152 may further include a user portal that grants access to the array of processor-on-demand systems 100-100p through the communications network 106, offering functionalities that enable users to review performance metrics and monitor the status of computational jobs. This portal serves as a centralized platform for users to manage their tasks and assess system efficiency, enhancing user experience and operational oversight. The management server 152 may comprise one or more servers.

Figure 1C:
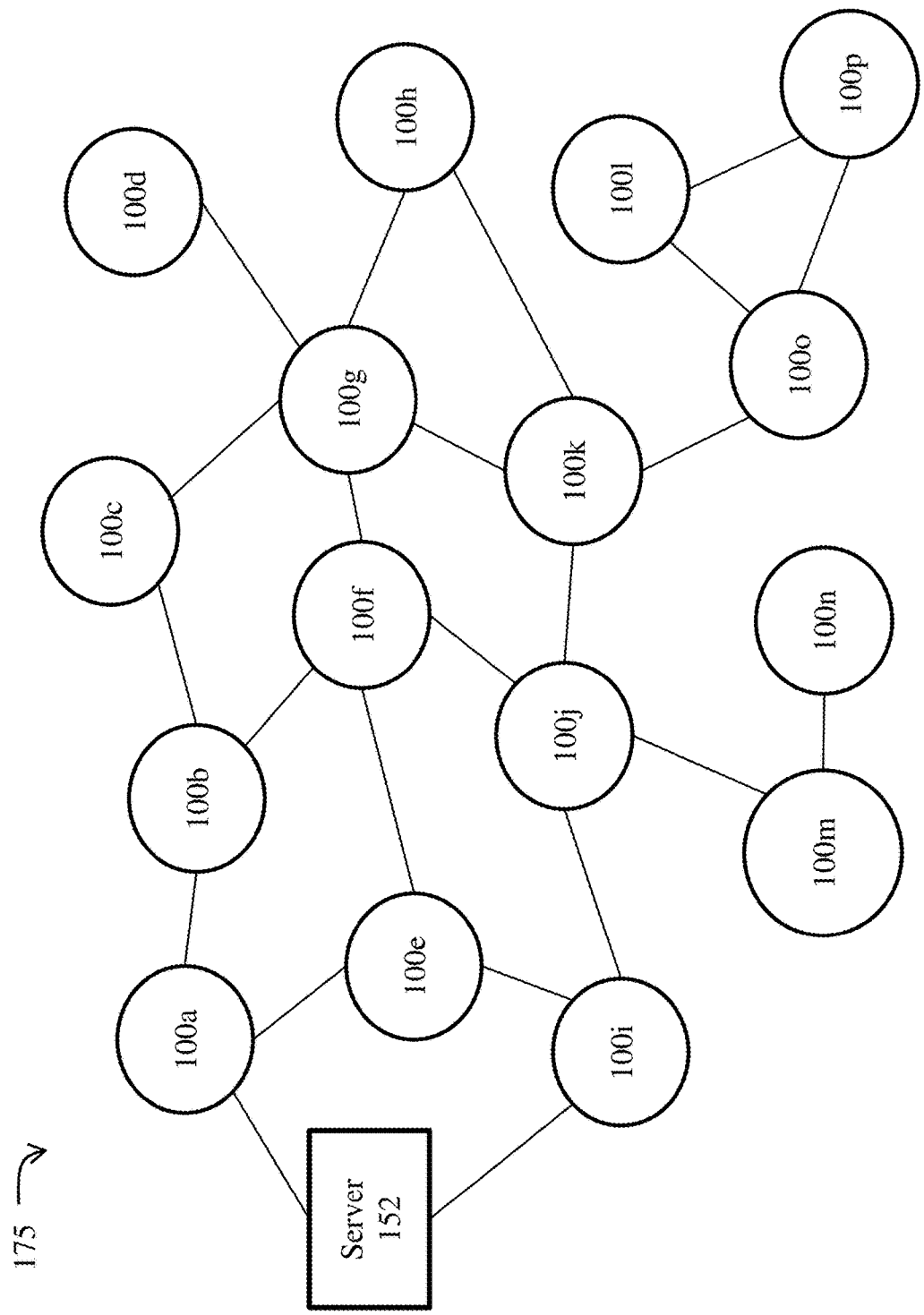
FIG. 1C is a block diagram illustrating a smart, bi-directional electrical microgrid comprising a plurality of processor-on-demand systems interconnected via a network of power lines, in accordance with one embodiment.

FIG. 1C is a block diagram illustrating a smart, bi-directional electrical microgrid 175 comprising a plurality of processor-on-demand systems 100a through 100p (also referred to as nodes in the microgrid), interconnected via a network of power lines, in accordance with one embodiment. FIG. 1C illustrates a network configuration of multiple processor-on-demand systems, specifically labeled from 100a through 100p, interconnected via a network of power lines. Figure shows that some nodes on the microgrid have multiple connections to the network, such as node 100g, which has four connections to the microgrid, while some nodes on the microgrid have a single connection to the network, such as nodes 100n and 100d. The network of power lines connecting the nodes may be equipped with smart grid technology, enabling not only the distribution of power but also the bi-directional flow of energy. This feature allows for the redistribution of energy within the microgrid, ensuring that excess power generated by one node can be utilized by others, thereby enhancing the efficiency and sustainability of the microgrid.

The network illustrated in FIG. 1C exemplifies a microgrid 175 due to its capability to function both independently and in conjunction with a larger electrical grid. This arrangement offers enhanced control over electricity generation, distribution, and usage within a localized area, comprising multiple processor-on-demand systems 100a though 100p interconnected via a sophisticated network of power lines. A defining characteristic of the depicted network as a microgrid is its ability to operate autonomously. Each processor-on-demand system within the network is equipped with its own distributed power resources, including potentially renewable energy sources and battery storage. This setup enables each unit to generate and store its own energy, contributing to the overall stability and resilience of the microgrid. In scenarios where the main power grid faces disruptions or outages, the microgrid can continue to operate independently, ensuring uninterrupted power supply and computational operations.

Furthermore, the integration of Energy Management Systems (EMS) in each processor-on-demand system enhances the microgrid's functionality by optimizing energy efficiency. And the network's use of a Large Language Model (LLM) for processing and analyzing energy metrics from each processor-on-demand system further underscores its classification as a microgrid. The LLM aids in creating sophisticated energy management plans that dynamically adapt to changes in energy demand and availability. Additionally, the presence of an API gateway in each unit facilitates secure, real-time communication across the microgrid. This system allows for the on-demand access and sharing of computational resources and energy data, enhancing the collaborative functionality of the microgrid. Collectively, these features enable the network to function as a self-regulating, adaptive microgrid. It not only supports local energy generation and consumption but also provides a reliable and efficient mechanism for managing power and computational needs within a confined geographical area. This self-sufficiency and enhanced control make the network in FIG. 1C an exemplary model of a modern microgrid.

The bi-directionality of the electrical microgrid depicted in FIG. 1C is a key feature that enhances the efficiency and functionality of the network, enabling a more dynamic management of energy flows among the interconnected processor-on-demand systems. This concept of bi-directionality in the grid refers to the capability for electricity to flow in multiple directions, rather than merely from a central power source to consumers. In traditional power grids, electricity flows in a unidirectional manner from power plants through transmission and distribution lines to end users. However, in the network of FIG. 1C, each processor-on-demand system not only consumes power but also has the ability to generate and send power back into the microgrid. This is made possible through each system's distributed power resources, which might include renewable energy sources such as solar panels or wind turbines, coupled with storage systems such as batteries. These resources enable each unit to act both as a consumer and a provider of power depending on the system's current needs and the state of the grid.

Bi-directionality in this context is facilitated by advanced Energy Management Systems (EMS) within each processor-on-demand system. These systems are capable of monitoring and controlling energy inputs and outputs in real-time, adjusting flows based on immediate energy needs across the network. For instance, if one unit is generating excess power due to low computational demand or high renewable energy output, this excess can be redirected to other units within the network that are under higher load, thereby optimizing the use of generated energy and reducing waste.

Moreover, the network's infrastructure, equipped with smart grid technology, supports this two-way energy flow. The power lines connecting the processor-on-demand systems are designed to handle and efficiently distribute electricity in both directions. This may include the incorporation of sophisticated grid technologies such as smart meters and automated switches that can detect and reroute power flows instantly to balance the grid's load and maintain stability.

The bi-directional flow capability of the grid not only increases energy efficiency but also enhances resilience and reliability. In the event of a power outage or reduced output from one or more units, other units within the grid can compensate by providing additional power. This interconnected and responsive approach ensures a continuous and stable power supply, crucial for maintaining uninterrupted high-performance computing operations across the network.

The designation of the network depicted in FIG. 1C as a "smart" microgrid is attributed to its advanced technological integration and capabilities that significantly enhance the control, efficiency, and reliability of both power and computational resource management. This smart grid employs sophisticated technologies to automate operations, optimize resource allocation, and improve the overall responsiveness of the system. Such technologies include the functionality of the EMS, the LLM, bi-directional energy flow supported by a network of power lines equipped with smart grid technology, and the API gateways.

FIG. 1C also shows one or more management servers 152 configured for managing the delivery and distribution of power among the plurality of processor-on-demand systems 100a through 100p to optimize for efficiency and uptime. The one or more management servers 152 are further configured to monitor real-time energy production and consumption data from each of the plurality of processor-on-demand systems and utilize advanced predictive algorithms to forecast energy demands based on historical data and current computational load. The one or more management servers 152 are further configured to dynamically adjust distribution of power among the plurality of processor-on-demand systems to optimize for energy efficiency and system uptime.

Additionally, the one or more management servers 152 are further configured to coordinate charging and discharging cycles of batteries within the plurality of processor-on-demand systems to maximize battery lifespan and efficiency, as well as integrate data from weather forecasting systems to anticipate changes in energy production from renewable sources, and adjust the microgrid operations accordingly. Also, the one or more management servers 152 are configured to provide a user interface that allows operators to manually override automated controls and make adjustments to energy distribution and computational load management based on operational need.

Figure 2:
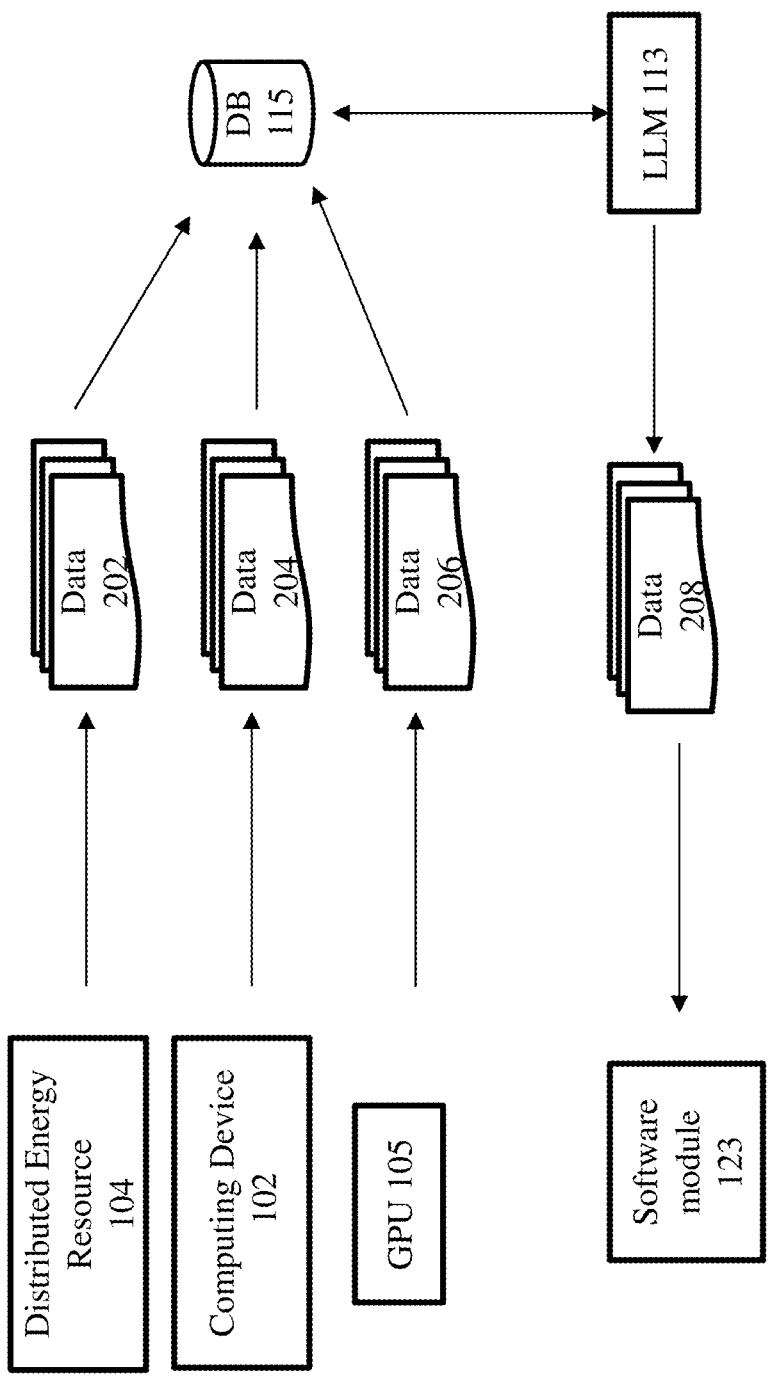
FIG. 2 is a block diagram showing the data flow of the process for providing a processor-on-demand system over a communications network, according to one embodiment.
Figure 3A:
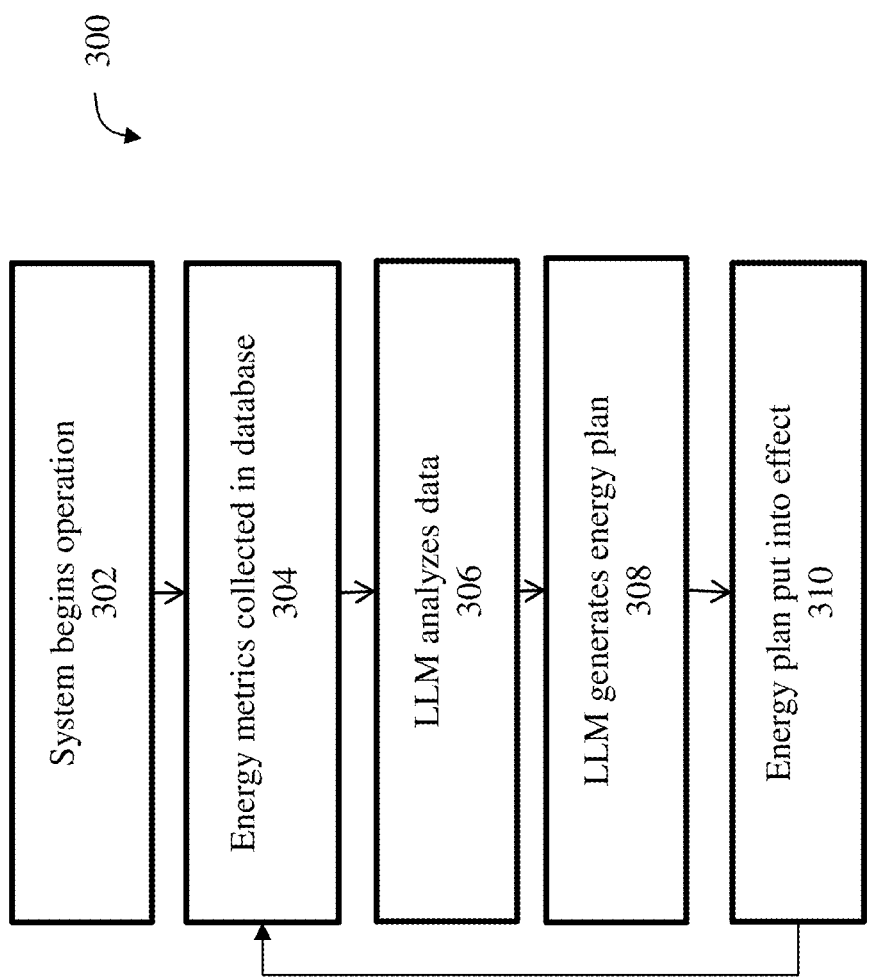
FIG. 3A is a flow chart depicting the general control flow of a process for providing a processor-on-demand system over a communications network, according to one embodiment.

FIGS. 2 and 3A depict the data flow and control flow of the process for providing a processor-on-demand system over a communications network 106, according to one embodiment. The process of the disclosed embodiments begins with step 302 (see flowchart 300), wherein the system 100 begins operation. In the next step 304, data 202-206 is collected and stored in the database 115.

The DER 104, encompassing various small-scale energy production and storage units, provides energy metrics 202 such as energy production levels, storage capacity, and utilization rates. These metrics are used for assessing the contribution of renewable energy sources and the efficiency of energy storage solutions within the system. Meanwhile, the computing device 102 contributes energy metrics 204, offering data about the power consumption of the system 100's computational operations. This includes data on overall energy usage, peak demand times, and efficiency ratings of the computing processes. The GPU 105 provides energy metrics 206 that detail its specific power usage, operational efficiency, and thermal statistics. These metrics describe the energy dynamics of high-performance computing tasks and for identifying opportunities to enhance the energy efficiency of GPU operations.

In step 306, the LLM 113 reads and analyzes the energy metrics stored in database 115. In step 308, LLM 113 synthesizes the collected data to create an energy management plan 208. This plan outlines strategic actions and operational adjustments aimed at optimizing the system 100's energy consumption and ensuring sustainable use of resources. This plan considers factors such as the optimal use of renewable energy sources, balancing the load across GPUs to maximize efficiency, and scheduling energy-intensive tasks during periods of low energy demand or high renewable energy production.

Once the energy management plan 208 is formulated, in step 310 it is communicated to the software module 123, which is tasked with implementing the plan. The software module 123 translates the plan into actionable adjustments in the system 100's operations. This may involve dynamically allocating computational tasks to different GPUs based on their energy efficiency, managing the charging and discharging cycles of energy storage in alignment with the DER 104, and adjusting the system's operational parameters to minimize energy consumption without compromising performance. The implementation of the plan ensures that energy usage is continuously optimized, reflecting a commitment to sustainability and efficiency in high-performance computing environments. Subsequently control flows back to step 304 wherein the process of steps 304-310 is executed continuously.

Figure 3B:
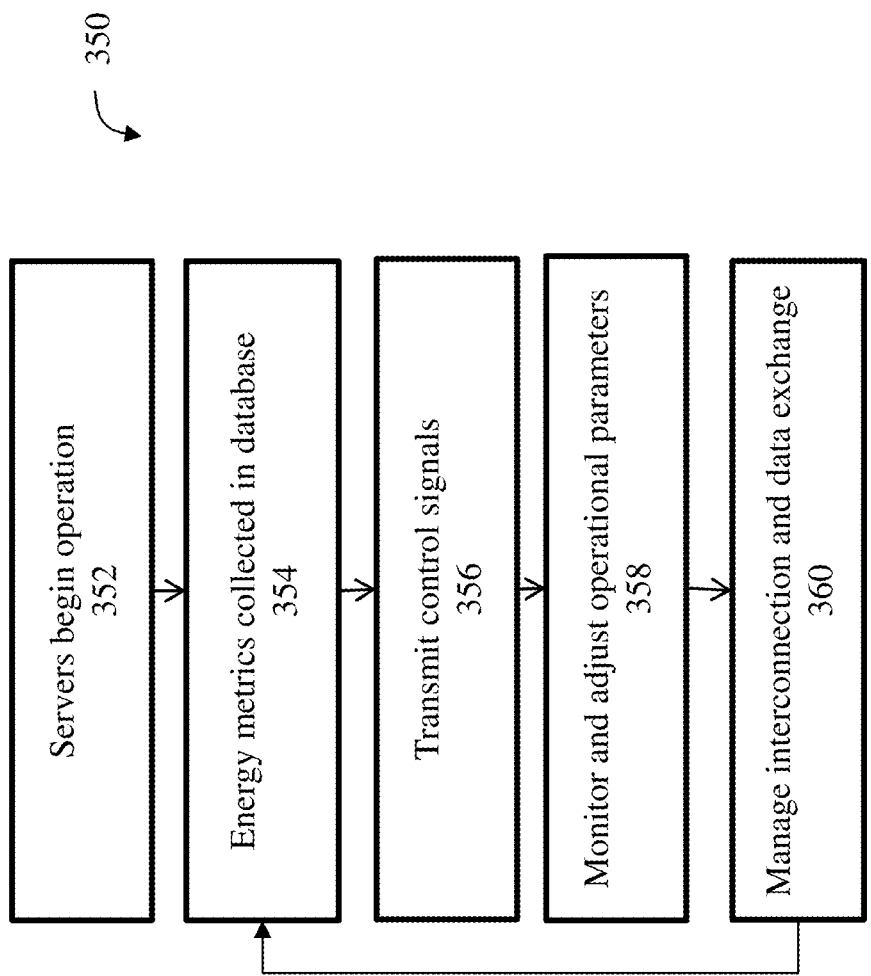
FIG. 3B is a flow chart depicting the general control flow of a process for managing a smart, bi-directional electrical microgrid comprising a plurality of processor-on-demand systems, according to one embodiment.

FIG. 3B is a flow chart depicting the general control flow of a process for managing a smart, bi-directional electrical microgrid 175 comprising a plurality of processor-on-demand systems 100a-100p, according to one embodiment. The process of the disclosed embodiments begins with step 352 (see flowchart 350), wherein the management servers 152 begins operation. In the next step 354, data 202-206 is collected from each of the plurality of processor-on-demand systems and optionally stored in database 115.

In step 356, the management servers 152 transmit control signals to each of the plurality of processor-on-demand systems 100a-100p to adjust power usage dynamically and optimize distribution of energy resources across the microgrid 175. The control signals are configured for coordinating energy distribution adjustments across the plurality of processor-on-demand systems 100a-100p in order to maintain system balance during peak demand periods and in response to microgrid instability. In step 358, the management servers 152 monitor and adjust operational parameters of each of the plurality of processor-on-demand systems 100a-100p in real-time to ensure continuous optimization of energy efficiency and computational performance. In step 360, the management servers 152 manage interconnection and data exchange between the plurality of processor-on-demand systems 100a-100p via the network of power lines, ensuring bi-directional flow and dynamic routing of power based on system-wide energy management strategies. Subsequently control flows back to step 354 wherein the process of steps 354-360 is executed continuously.

The disclosed embodiments described above primarily focus on the use of on-demand GPUs for high-performance computing within the bi-directional electrical microgrid. However, the disclosed embodiments are designed with a modular architecture that supports a variety of processing units, allowing it to adapt to different computational needs and energy requirements by swapping out or adding other types of processing units alongside or in place of the one or more GPUs 105. This modularity enables the system to incorporate multiple processing technologies, each suited to specific computational tasks.

In one embodiment, the system includes provisions for different types of processing units, which can be installed interchangeably or in combination with the GPU 105 to enhance the system's performance and adaptability across various applications. These processing units may include CPUs (Central Processing Units) for general-purpose computing tasks that require a balanced approach to processing power and efficiency, DPUs (Data Processing Units) for accelerating data-centric workloads such as network and storage processing, TPUs (Tensor Processing Units) specifically designed for machine learning and deep learning operations, and NPUs (Neural Processing Units) optimized for neural network computations, allowing real-time AI inferencing and training. Additionally, APUs (Accelerated Processing Units) combine CPU and GPU functionality on a single chip to optimize both general-purpose and graphics-related computing tasks. FPUs (Floating Point Units) handle floating-point arithmetic operations, particularly useful in scientific and engineering applications, while MCUs (Microcontroller Units) manage real-time control and processing with minimal power consumption, making them ideal for embedded systems and energy management.

Furthermore, VPUs (Vision Processing Units) enhance image and video processing tasks, enabling applications related to computer vision and real-time video analytics, and PIMs (Processing In Memory) increase efficiency in data-intensive workloads by integrating processing capabilities directly into memory units. This broad range of processing units offers flexibility, allowing the system to meet diverse computational needs effectively.

The modular design of the system ensures that any combination of these processing units can be incorporated into a single node within the microgrid. For example, a node could include a GPU and TPU for tasks requiring both graphical rendering and deep learning capabilities, or a combination of CPU, APU, and FPU for scientific computations that need a mix of general-purpose and specialized arithmetic processing. The ability to swap or add processing units as needed ensures the system remains adaptable and scalable for various applications.

The software module 123 responsible for managing energy and computational efficiency is designed to handle these diverse processing units dynamically. The energy management plan generated by the Large Language Model (LLM) 113 can adjust the allocation of tasks to each processing unit based on the specific computational needs, available energy resources, and real-time system demands. For instance, if a particular workload is better suited to a TPU than a GPU, the software module 123 can route the task accordingly, ensuring optimal performance and energy consumption.

The integration of different processing units into the microgrid enhances the system's energy management capabilities. Each type of processing unit, whether a GPU, TPU, or DPU, has distinct energy consumption characteristics. The Energy Management System (EMS) 124 monitors the energy usage of each unit and dynamically allocates power to balance the system's overall energy efficiency. The software module 123 can prioritize the use of more energy-efficient units, such as MCUs for low-power tasks, while still providing high-performance resources for computationally demanding tasks like those requiring a GPU or TPU.

The system's scalability allows additional processing units to be added as computational demands increase. This scalability is essential for applications in artificial intelligence, data analytics, and edge computing, where different workloads may benefit from the specific capabilities of various processing units. The modular architecture ensures that newly added or swapped processing units integrate seamlessly into the existing microgrid with minimal disruption and without requiring significant changes to the overall system design.

Figure 5:
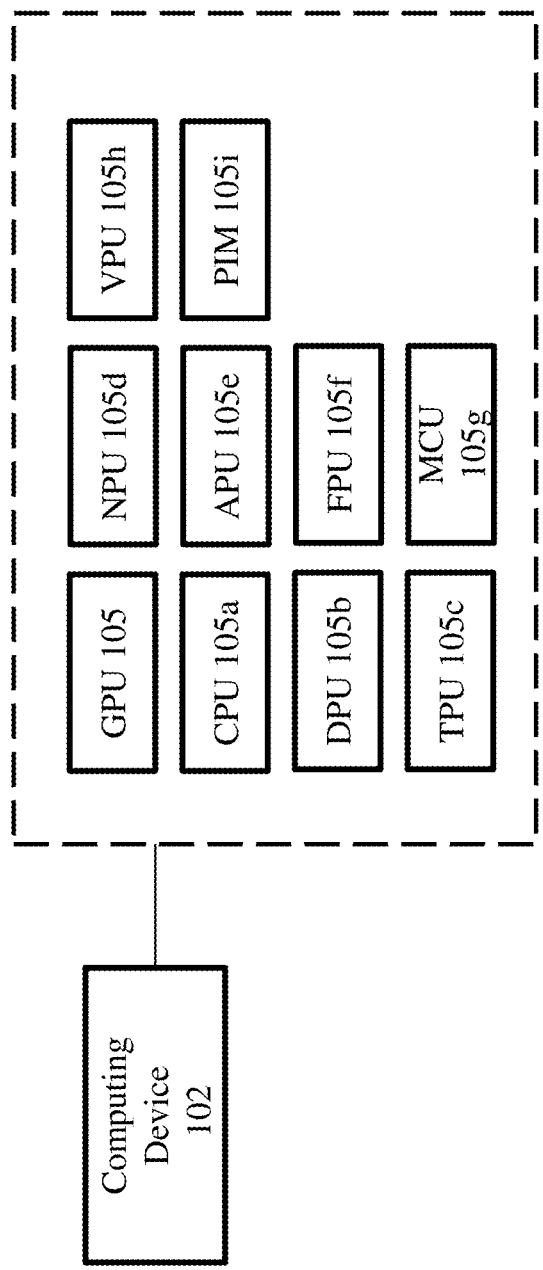
FIG. 5 is a block diagram illustrating an alternative to the network architecture of FIG. 1A, in accordance with one embodiment.

To illustrate the expanded functionality, FIG. 5 depicts the integration and management of different processing units. FIG. 5 is a block diagram illustrating an alternative to the network architecture of FIG. 1A, in accordance with one embodiment. FIG. 5 shows a variation of the network architecture of FIG. 1A, wherein a node configuration with multiple processing units 500 is installed alongside each other. Said multiple processing units 500 comprise the GPU 105, CPU 105a, DPU 105b, TPU 105c, NPU 105d, APU 105e, FPU 105f, MCU 105g, VPU 105h and PIM 105i. Said multiple processing units 500 are managed by the EMS 124 and API gateway 103. Further, the software module 123 dynamically assigns tasks to the most appropriate processing unit based on the current energy management plan and workload. This modular, adaptable approach enhances the versatility of the bi-directional electrical microgrid, enabling it to efficiently address the computational and energy needs of a wide range of applications.

Figure 4:
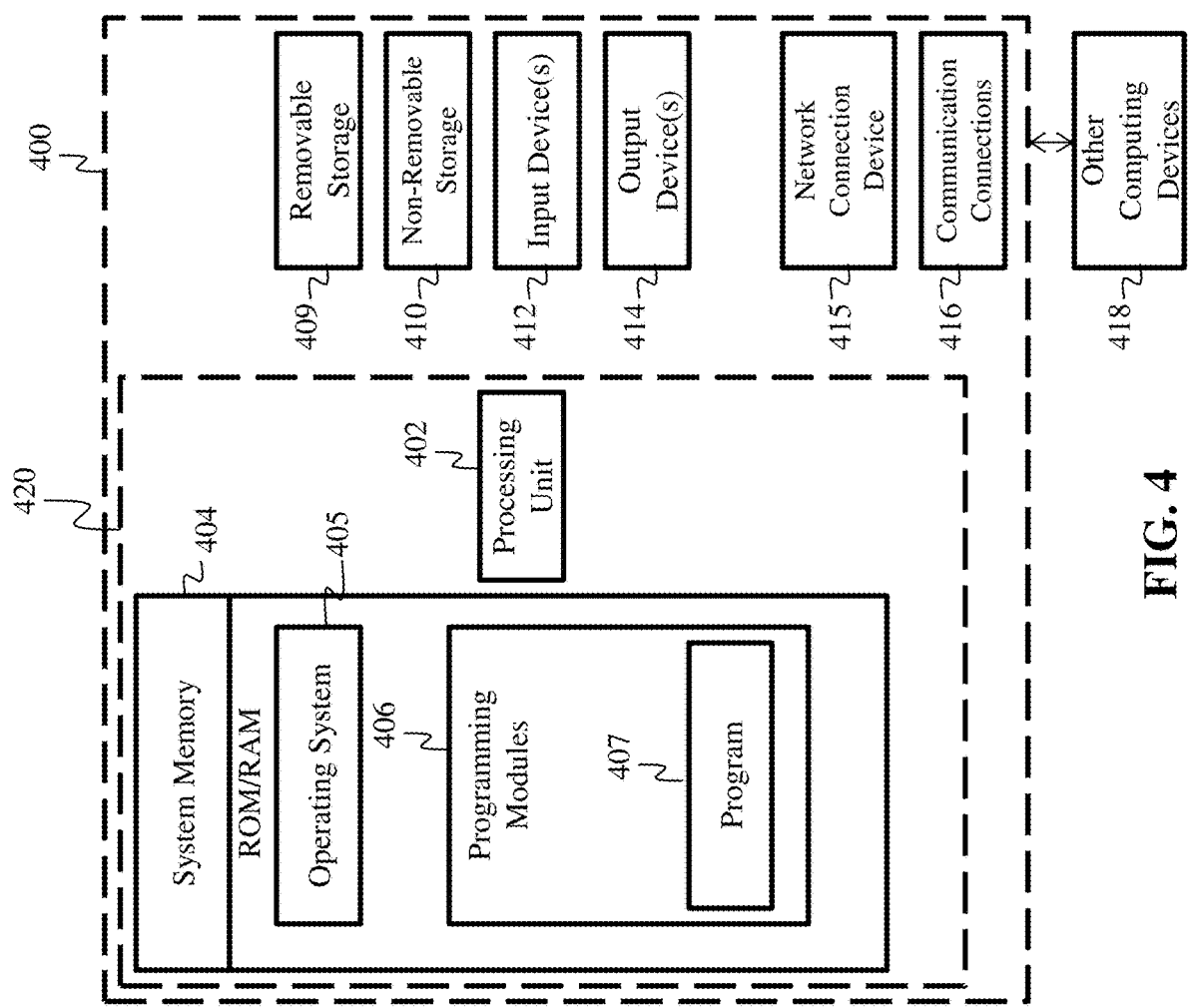
FIG. 4 is a block diagram depicting a system including an example computing device and other computing devices.

FIG. 4 is a block diagram of a system including an example computing device 400 and other computing devices. Consistent with the embodiments described herein, the aforementioned actions performed by 102, 104, 124, 134, 105, 170 may be implemented in a computing device, such as the computing device 400 of FIG. 4. Any suitable combination of hardware, software, or firmware may be used to implement the computing device 400. The aforementioned system, device, and processors are examples and other systems, devices, and processors may comprise the aforementioned computing device. Furthermore, computing device 400 may comprise an operating environment for devices 102, 104, 124, 134, 105, 170 and processes 300, 350, as described above. Processes 300, 350 may operate in other environments and are not limited to computing device 400.

With reference to FIG. 4, a system consistent with an embodiment may include a plurality of computing devices, such as computing device 400. In a basic configuration, computing device 400 may include at least one processing unit 402 and a system memory 404. Depending on the configuration and type of computing device, system memory 404 may comprise, but is not limited to, volatile (e.g. random-access memory (RAM)), non-volatile (e.g. read-only memory (ROM)), flash memory, or any combination or memory. System memory 404 may include operating system 405, and one or more programming modules 406. Operating system 405, for example, may be suitable for controlling computing device 400's operation. In one embodiment, programming modules 406 may include, for example, a program module 407 for executing the actions of devices 102, 104, 124, 134, 105, 170. Furthermore, embodiments may be practiced in conjunction with a graphics library, other operating systems, or any other application program and is not limited to any particular application or system. This basic configuration is illustrated in FIG. 4 by those components within a dashed line 420.

Computing device 400 may have additional features or functionality. For example, computing device 400 may also include additional data storage devices (removable and/or non-removable) such as, for example, magnetic disks, optical disks, or tape. Such additional storage is illustrated in FIG. 4 by a removable storage 409 and a non-removable storage 410. Computer storage media may include volatile and nonvolatile, removable and non-removable media implemented in any method or technology for storage of information, such as computer readable instructions, data structures, program modules, or other data. System memory 404, removable storage 409, and non-removable storage 410 are all computer storage media examples (i.e. memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 400. Any such computer storage media may be part of device 400. Computing device 400 may also have input device(s) 412 such as a keyboard, a mouse, a pen, a sound input device, a camera, a touch input device, etc. Output device(s) 414 such as a display, speakers, a printer, etc. may also be included. Computing device 400 may also include a vibration device capable of initiating a vibration in the device on command, such as a mechanical vibrator or a vibrating alert motor. The aforementioned devices are only examples, and other devices may be added or substituted.

Computing device 400 may also contain a network connection device 415 that may allow device 400 to communicate with other computing devices 418, such as over a network in a distributed computing environment, for example, an intranet or the Internet. Device 415 may be a wired or wireless network interface controller, a network interface card, a network interface device, a network adapter or a LAN adapter. Device 415 allows for a communication connection 416 for communicating with other computing devices 418. Communication connection 416 is one example of communication media. Communication media may typically be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer readable media as used herein may include both computer storage media and communication media.

As stated above, a number of program modules and data files may be stored in system memory 404, including operating system 405. While executing on processing unit 402, programming modules 406 (e.g. program module 407) may perform processes including, for example, one or more of the stages of the processes 300, 350 as described above. The aforementioned processes are examples, and processing unit 402 may perform other processes. Other programming modules that may be used in accordance with embodiments herein may include electronic mail and contacts applications, word processing applications, spreadsheet applications, database applications, slide presentation applications, drawing or computer-aided application programs, etc.

Generally, consistent with embodiments herein, program modules may include routines, programs, components, data structures, and other types of structures that may perform particular tasks or that may implement particular abstract data types. Moreover, embodiments herein may be practiced with other computer system configurations, including handheld devices, multiprocessor systems, microprocessor-based or programmable consumer electronics, minicomputers, mainframe computers, and the like. Embodiments herein may also be practiced in distributed computing environments where tasks are performed by remote processing devices that are linked through a communications network. In a distributed computing environment, program modules may be located in both local and remote memory storage devices.

Furthermore, embodiments herein may be practiced in an electrical circuit comprising discrete electronic elements, packaged or integrated electronic chips containing logic gates, a circuit utilizing a microprocessor, or on a single chip (such as a System on Chip) containing electronic elements or microprocessors. Embodiments herein may also be practiced using other technologies capable of performing logical operations such as, for example, AND, OR, and NOT, including but not limited to mechanical, optical, fluidic, and quantum technologies. In addition, embodiments herein may be practiced within a general purpose computer or in any other circuits or systems.

Embodiments herein, for example, are described above with reference to block diagrams and/or operational illustrations of methods, systems, and computer program products according to said embodiments. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments have been described, other embodiments may exist. Furthermore, although embodiments herein have been described as being associated with data stored in memory and other storage mediums, data can also be stored on or read from other types of computer-readable media, such as secondary storage devices, like hard disks, floppy disks, or a CD-ROM, or other forms of RAM or ROM. Further, the disclosed methods' stages may be modified in any manner, including by reordering stages and/or inserting or deleting stages, without departing from the claimed subject matter.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A smart, bi-directional electrical microgrid comprising:
   a) a plurality of processor-on-demand systems, wherein each processor-on-demand system comprises:
      1) a computing device including a processing unit and a memory, wherein the processing unit is selected from a central processing unit, a graphics processing unit, a data processing unit, tensor processing unit, neural processing unit, accelerated processing unit, floating point unit, microcontroller unit, vision processing unit, and processing in memory;
      2) an Energy Management System (EMS) configured for regulating power usage and optimizing energy efficiency;
      3) a distributed power resource configured for providing a stable and efficient energy supply;
      4) a database configured to store energy metrics gathered from the processor-on-demand system, the energy metrics including at least energy expenditure of the processor-on-demand system;
      5) a Large Language Model (LLM) executing on the computing device, the LLM configured for processing the energy metrics stored in the database so as to generate an energy management plan that is configured to: i) manage when the distributed power resource shall be used by the processor-on-demand system, ii) dynamically adjust computing tasks of the computing device based on current energy availability and predicted workload, and iii) maximize processing unit utilization while adhering to energy efficiency goals;
      6) an API gateway comprising an API coupled to a network connection providing access to a communications network, the API gateway configured for providing external systems secure, on-demand access to the processing unit, and wherein the API gateway is configured to manage load on the computing device; and
      7) a software module executing on the computing device, the software module configured for managing the processor-on-demand system according to the energy management plan generated by the LLM by: i) controlling usage of the distributed power resource, ii) rate limiting the API gateway and iii) dynamically adjusting the computing tasks of the computing device;
   b) one or more management servers configured for managing the delivery and distribution of power among the plurality of processor-on-demand systems to optimize for efficiency and uptime; and
   c) a network of power lines that interconnect the plurality of processor-on-demand systems.

2. The electrical microgrid of claim 1, wherein the EMS utilizes predictive analytics to forecast energy demand of the computing device and proactively adjust power usage of the computing device.

3. The electrical microgrid of claim 2, wherein the distributed power resource further comprises a battery and a battery management system (BMS), wherein the battery comprises battery cells, and the BMS includes algorithms for state-of-charge (SoC) and state-of-health (SoH) monitoring to extend battery life and performance.

4. The electrical microgrid of claim 3, wherein the distributed power resource further includes renewable energy sources integrated with the BMS to prioritize the use of renewable energy.

5. The electrical microgrid of claim 4, wherein database is further configured to encrypt sensitive data, including energy consumption patterns and operational parameters, ensuring data privacy and security.

6. The electrical microgrid of claim 5, wherein the energy management plan is configured to optimize energy consumption and reduce operational costs.

7. The electrical microgrid of claim 6, wherein the energy management plan is configured to dynamically adjust computing tasks of the computing device based on current energy availability and predicted workload, to maximize processing unit utilization while adhering to energy efficiency goals.

8. The electrical microgrid of claim 6, wherein the API gateway comprises security features including encryption and authentication protocols to ensure secure data transmission and access control.

9. The electrical microgrid of claim 8, wherein the API gateway supports multiple protocols for integration with various external systems, including REST, GraphQL, and WebSocket, so as to facilitate on-demand processing services.

10. The electrical microgrid of claim 9, wherein the software module includes a user interface (UI) that provides real-time monitoring and control over the energy management plan, allowing users to manually adjust operational parameters and set energy efficiency goals.

11. The electrical microgrid of claim 10, wherein the software module provides automated reports on energy savings and system performance that allow users to track improvements over time and identify areas for further optimization.

12. The electrical microgrid of claim 11, further comprising a second power source connected to the EMS and the computing device.

13. The electrical microgrid of claim 12, wherein the EMS is further configured to automatically switch between the power source and the second power source based on predefined criteria, including cost of electricity and carbon footprint, so as to meet defined energy efficiency goals.

14. The electrical microgrid of claim 13, wherein the LLM is further configured for identifying problem issues and providing troubleshooting advice to a user.

15. The electrical microgrid of claim 13, wherein the one or more management servers are further configured to: a) monitor real-time energy production and consumption data from each of the plurality of processor-on-demand systems; b) utilize advanced predictive algorithms to forecast energy demands based on historical data and current computational load; c) dynamically adjust distribution of power among the plurality of processor-on-demand systems to optimize for energy efficiency and system uptime; d) coordinate charging and discharging cycles of batteries within the plurality of processor-on-demand systems to maximize battery lifespan and efficiency; e) integrate data from weather forecasting systems to anticipate changes in energy production from renewable sources, and adjust the microgrid operations accordingly; f) provide a user interface that allows operators to manually override automated controls and make adjustments to energy distribution and computational load management based on operational need.

16. The electrical microgrid of claim 13, wherein the network of power lines is further configured to support bi-directional flow of electricity, allowing distribution of power to and from each of the plurality of processor-on-demand systems.

17. A method on a server for managing a smart, bi-directional electrical microgrid of a plurality of processor-on-demand systems, the method comprising:

a) collecting energy metrics from each of the plurality of processor-on-demand systems, wherein each processor-on-demand system includes:
1) a computing device with a processing unit and a memory, wherein the processing unit is selected from a central processing unit, a graphics processing unit, a data processing unit, tensor processing unit, neural processing unit, accelerated processing unit, floating point unit, microcontroller unit, vision processing unit, and processing in memory;
2) an Energy Management System (EMS) configured for regulating power usage and optimizing energy efficiency;
3) a distributed power resource providing a stable and efficient energy supply;
4) a database for storing energy metrics, including at least energy expenditure;
5) a Large Language Model (LLM) configured for processing the energy metrics so as to generate an energy management plan that is configured to: i) manage when the distributed power resource shall be used by the processor-on-demand system, ii) dynamically adjust computing tasks of the computing device based on current energy availability and predicted workload, and iii) maximize processing unit utilization while adhering to energy efficiency goals;
6) an API gateway comprising an API coupled to a network connection providing access to a communications network, the API gateway configured for providing external systems secure, on-demand access to the processing unit, and wherein the API gateway is configured to manage load on the computing device; and
7) a software module configured for managing the processor-on-demand system according to the energy management plan generated by the LLM by: i) controlling usage of the distributed power resource, ii) rate limiting the API gateway and iii) dynamically adjusting the computing tasks of the computing device;
b) reading the collected energy metrics from each of the plurality of processor-on-demand systems;
c) transmitting control signals from a centralized management server to each of the plurality of processor-on-demand systems to adjust power usage dynamically and optimize distribution of energy resources across the microgrid;
d) monitoring and adjusting operational parameters of each of the plurality of processor-on-demand systems in real-time to ensure continuous optimization of energy efficiency and computational performance; and
e) managing interconnection and data exchange between the plurality of processor-on-demand systems via a network of power lines, ensuring bi-directional flow and dynamic routing of power based on system-wide energy management strategies.

18. The method of claim 17, wherein the control signals are configured for coordinating energy distribution adjustments across the plurality of processor-on-demand systems in order to maintain system balance during peak demand periods and in response to microgrid instability.

* * * * *